United States Patent
Kotani et al.

(10) Patent No.: US 9,239,175 B2
(45) Date of Patent: Jan. 19, 2016

(54) AIR CONDITIONER AND HEAT SOURCE UNIT WITH OTHER UNIT START UP CONTROL

(75) Inventors: Takuya Kotani, Osaka (JP); Kikuji Hori, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 989 days.

(21) Appl. No.: 12/278,321

(22) PCT Filed: Feb. 15, 2007

(86) PCT No.: PCT/JP2007/052677
§ 371 (c)(1),
(2), (4) Date: Aug. 5, 2008

(87) PCT Pub. No.: WO2007/097238
PCT Pub. Date: Aug. 30, 2007

(65) Prior Publication Data
US 2009/0056358 A1 Mar. 5, 2009

(30) Foreign Application Priority Data
Feb. 20, 2006 (JP) .................................. 2006-042558

(51) Int. Cl.
*F25B 7/00* (2006.01)
*F25B 41/00* (2006.01)
(Continued)

(52) U.S. Cl.
CPC ............... *F25B 13/00* (2013.01); *F24F 5/0017* (2013.01); *F25B 45/00* (2013.01); *F25B 2313/006* (2013.01); *F25B 2313/0233* (2013.01); *F25B 2313/0253* (2013.01); *F25B 2313/02742* (2013.01); *F25B 2400/13* (2013.01);
(Continued)

(58) Field of Classification Search
CPC .... F25B 13/00; F25B 45/00; F25B 2313/006; F25B 2313/0233; F25B 2313/0253; F25B 2313/02742; F25B 2400/13; F25B 2400/19; F25B 2500/26; F25B 2600/05
USPC .......................... 62/175, 196.4, 503, 510, 513
See application file for complete search history.

(56) References Cited

U.S. PATENT DOCUMENTS 5,142,877 A * 9/1992 Shimizu .......................... 62/129
5,245,837 A * 9/1993 Kitamoto ........................ 62/175
(Continued)

FOREIGN PATENT DOCUMENTS

| JP | H05-288422 A | 11/1993 |
| JP | H11-063711 A | 3/1999 |

(Continued)

OTHER PUBLICATIONS

European Search Report of corresponding EP Application No. 07 70 8407.7 dated May 19, 2014.

*Primary Examiner* — Marc Norman
*Assistant Examiner* — Paolo Gonzalez
(74) *Attorney, Agent, or Firm* — Global IP Counselors (57) ABSTRACT

An air conditioner is provided with a plurality of outdoor heat source units, an indoor unit, a liquid refrigerant communication pipe and gas refrigerant communication pipe, and a controller. Each heat source unit has a compressor, an outdoor heat exchanger, and an accumulator. The indoor unit has an indoor expansion valve and an indoor heat exchanger. The controller starts an other of the heat source units in a stopped state when it is determined that the amount of refrigerant is excessive in a first heat source unit in an operating state.

14 Claims, 5 Drawing Sheets (51) Int. Cl.
 *F25B 13/00* (2006.01)
 *F24F 5/00* (2006.01)
 *F25B 45/00* (2006.01)

(52) U.S. Cl.
 CPC ......... *F25B2400/19* (2013.01); *F25B 2500/26* (2013.01); *F25B 2600/05* (2013.01); *Y02E 60/147* (2013.01)

(56) References Cited

U.S. PATENT DOCUMENTS

| | | | | |
|---|---|---|---|---|
| 5,263,333 | A | * | 11/1993 | Kubo et al. .................... 62/175 |
| 5,361,595 | A | | 11/1994 | Shimura et al. |
| 5,467,604 | A | * | 11/1995 | Sekigami et al. ............... 62/117 |
| 5,490,399 | A | * | 2/1996 | Sada ............................... 62/510 |
| 5,526,649 | A | * | 6/1996 | Sada ............................... 62/175 |
| 5,548,968 | A | * | 8/1996 | Sada ............................... 62/175 |
| 6,058,728 | A | | 5/2000 | Takano et al. |
| 6,237,358 | B1 | * | 5/2001 | Kondo et al. ................... 62/335 |
| 6,581,408 | B1 | * | 6/2003 | Tadano et al. .................. 62/513 |
| 7,140,198 | B2 | * | 11/2006 | Matsuoka et al. .............. 62/498 |
| 2001/0000050 | A1 | * | 3/2001 | Okazaki et al. ................. 62/149 |
| 2005/0252221 | A1 | * | 11/2005 | Mizutani et al. ................ 62/149 |
| 2006/0080989 | A1 | * | 4/2006 | Aoki et al. .................... 62/324.4 |
| 2006/0123809 | A1 | * | 6/2006 | Ha et al. .......................... 62/149 |

FOREIGN PATENT DOCUMENTS

| | | |
|---|---|---|
| JP | H11-108472 A | 4/1999 |
| JP | H11-257762 A | 9/1999 |
| JP | 2000-146345 A | 5/2000 |
| JP | 2001-041528 A | 2/2001 |

* cited by examiner

AIR CONDITIONER AND HEAT SOURCE UNIT WITH OTHER UNIT START UP CONTROL

CROSS-REFERENCE TO RELATED APPLICATIONS

This U.S. National stage application claims priority under 35 U.S.C. §119(a) to Japanese Patent Application No. 2006-042558, filed in Japan on Feb. 20, 2006, the entire contents of which are hereby incorporated herein by reference.

TECHNICAL FIELD

The present invention relates to an air conditioner and a heat source unit, and particularly relates to an air conditioner in which a plurality of heat source units is present in a single refrigerant circuit.

BACKGROUND OF THE INVENTION

Conventionally, there are multi-air conditioners having a plurality of outdoor units (heat source units) and numerous indoor units (utilization units) in a single refrigerant circuit. For example, a multi-air conditioner is described in JP-A Publication No. 2001-41528 in which a plurality of compressors is designed to have a more uniform operating time while a plurality of outdoor units is designed to have a more uniform operating time. Also, a multi-air conditioner is described in JP-A Publication No. 11-63711 that is provided with a compressor, a plurality of outdoor units having an outdoor heat exchanger and an accumulator, a plurality of indoor units, a gas refrigerant communication pipe and a liquid refrigerant communication pipe that are shared in the two units, and a bypass circuit for feeding liquid refrigerant inside the accumulator of an outdoor unit to the outdoor heat exchanger of another outdoor unit.

BRIEF SUMMARY OF THE INVENTION

Problems the Invention is Intended to Solve

In an air conditioner provided with a plurality of outdoor units in this manner, there is a problem in that excess refrigerant is generated in the outdoor unit when the refrigerant becomes unbalanced in a portion of the outdoor units among the plurality of outdoor units, and the refrigerant stagnates in the outdoor heat exchanger or the like. In order to solve such a problem, a method may be considered in which the capacity of the accumulators is increased so as to be capable of holding the excess refrigerant, but this works against the demand for a more compact outdoor unit.

An object of the present invention is to provide an air conditioner provided with a plurality of outdoor units (heat source units), the air conditioner being able to reduce situations in which excess refrigerant pools in the outdoor units and smooth operation is disrupted, even in cases in which the capacity of the accumulator is relatively small.

Means for Solving the Problems

The air conditioner according to a first aspect is provided with a plurality of heat source units, a utilization unit, a liquid refrigerant communication pipe and a gas refrigerant communication pipe, and a controller. One unit of the plurality of heat source units is a first heat source unit. The heat source unit has a compressor, a heat source-side heat exchanger, and an accumulator. The utilization unit has a utilization-side expansion mechanism and a utilization-side heat exchanger. The liquid refrigerant communication pipe and the gas refrigerant communication pipe connect the plurality of heat source units and the utilization unit and form a single main refrigerant circuit. A controller performs other-unit startup control for starting up another of the heat source units in a stopped state, or performs refrigerant accumulation control for accumulating refrigerant in the accumulator in a heat source unit other than the first heat source unit in an operating state, when the amount of refrigerant in the first heat source unit in an operating state has been determined to be excessive.

In this case, the refrigerant compressed by the compressor flows through the main refrigerant circuit, heat is exchanged in the utilization-side heat exchanger, and air is conditioned. Control (refrigerant accumulation control) is carried out to start up another of the heat source units in a stopped state or to accumulate refrigerant in the accumulator in the other heat source unit, when the amount of refrigerant in the first heat source unit in an operating state has been determined to be excessive. In accordance with the former other-unit startup control, the refrigerant is moved from the first heat source unit in which refrigerant is excessive to the other heat source unit by setting the other heat source unit in an operating state. Air is conditioned by the other heat source unit by using other-unit startup control, the first heat source unit in which the refrigerant has become excessive is stopped, and the movement of refrigerant from the first heat source unit to the other heat source unit is facilitated. Refrigerant can be moved from the first heat source unit to the other heat source unit when refrigerant accumulation control is to be performed in the other heat source unit. Therefore, with the air conditioner according to the present invention, it is possible to reduce situations in which excess refrigerant pools in the first heat source unit and smooth operation is disrupted, even in cases in which the capacity of the accumulator is relatively small.

The air conditioner according to a second aspect is the air conditioner according to the first aspect, wherein the controller first performs the refrigerant accumulation control in the first heat source unit when prescribed refrigerant accumulation conditions have been formed in the first heat source unit, and performs the other-unit startup control or the refrigerant accumulation control in a heat source unit other than the first heat source unit when the amount of refrigerant is determined to be excessive in the first heat source unit during refrigerant accumulation control thereof.

In this case, first, refrigerant accumulation control for accumulating the refrigerant in the accumulator is carried out on the basis of prescribed refrigerant accumulation conditions in the first heat source unit prior to the execution of other-unit startup control or refrigerant accumulation control in the other heat source unit. Accordingly, the amount of refrigerant can be adjusted by first directing excess refrigerant to the accumulator when the excess refrigerant has been generated, and the number of times that the other heat source unit is affected can be reduced.

The air conditioner according to a third aspect is the air conditioner according to the first or second aspect, wherein the accumulator is disposed on the intake side of the compressor in the heat source unit. Also, the heat source unit further has a bypass refrigerant circuit. The bypass refrigerant circuit has a bypass flow control valve for adjusting the flow rate of the refrigerant, and directs the refrigerant between the heat source-side heat exchanger and the liquid refrigerant communication pipe to the accumulator.

In this case, the accumulator disposed on the intake side of the compressor acts to keep the liquid refrigerant and the gas refrigerant separate to prevent the intake of the liquid refrigerant into the compressor, and the liquid refrigerant can be made to flow into the accumulator via the bypass refrigerant circuit. Excess liquid refrigerant can thereby be reliably accumulated in the accumulator.

The air conditioner according to a fourth aspect is the air conditioner according to the third aspect, wherein the heat source unit further has a supercooler. The supercooler cools a refrigerant sent from the heat source-side heat exchanger to the utilization unit via the liquid refrigerant communication pipe, using the refrigerant that flows from the bypass flow control valve to the accumulator.

In this case, the liquid refrigerant can be supercooled using the bypass refrigerant circuit that directs excess liquid refrigerant to the accumulator.

The air conditioner according to a fifth aspect is the air conditioner according to the any of the first to fourth aspects, wherein the controller determines that the amount of refrigerant is excessive in the first heat source unit when the degree of superheat of the gas refrigerant on the discharge side of the compressor has fallen below a prescribed value.

In this case, other-unit startup control and refrigerant accumulation control in another of the heat source units is performed when the degree of superheat of the gas refrigerant on the discharge side of the compressor is low. Therefore, a malfunction can be prevented in which operation is carried out with the excess refrigerant in the first heat source unit and the refrigerant in a gas-liquid two-phase state is drawn into the compressor.

The air conditioner according to a sixth aspect is the air conditioner according to the fourth aspect, wherein the controller determines that the amount of refrigerant is excessive in the heat source unit when the bypass flow control valve is completely open or when the degree of superheat of the gas refrigerant on the discharge side of the compressor has fallen below a prescribed value.

The air conditioner according to a seventh aspect is the air conditioner according to the second aspect, wherein the prescribed refrigerant accumulation conditions during cooling operation include at least a first condition and/or a second condition. The first condition is a condition in which the degree of refrigerant supercooling at the outlet of the heat source-side heat exchanger is higher than a prescribed value. The second condition is a condition in which the pressure of the high-pressure refrigerant on the discharge side of the compressor is higher than a prescribed value.

The air conditioner according to an eighth aspect is the air conditioner according to the second aspect, wherein the heat source unit further has a heat source-side expansion mechanism. The heat source-side expansion mechanism includes an expansion valve disposed between the heat source-side heat exchanger and the liquid refrigerant communication pipe. The prescribed refrigerant accumulation conditions during heating operation include at least a third condition in which the expansion valve of the heat source-side expansion mechanism is completely open.

The air conditioner according to a ninth aspect is the air conditioner according to any of the first to eighth aspects, wherein the controller performs the other-unit startup control rather than the refrigerant accumulation control in the heat source unit other than the first heat source unit in an operating state in the case that the heat source unit in a stopped state is present when the amount of refrigerant in the first heat source unit in an operating state has been determined to be excessive.

It is more effective to start up another heat source unit in a stopped state than to perform refrigerant accumulation control in the other heat source unit in an operating state in terms of resolving the excess state of the refrigerant in the first heat source unit. Therefore, in this case, when the other heat source unit is in a stopped state, priority is given to start up the stopped heat source unit. The continuation of operation of the first heat source unit in a state in which excess refrigerant is present can thereby be resolved at an earlier stage.

The air conditioner according to a tenth aspect is the air conditioner according to any of the first to ninth aspects, wherein the controller sets a refrigerant accumulation-processed flag in the heat source unit for which refrigerant accumulation control has been performed. The controller performs the other-unit startup control or the refrigerant accumulation control in the heat source unit in which the refrigerant accumulation-processed flag has not been set, when the amount of refrigerant in the first heat source unit in an operating state is determined to be excessive.

The heat source unit for which refrigerant accumulation control has been performed a single time is more likely to have a relatively large amount of liquid refrigerant accumulated in the accumulator. Accordingly, in this case, when an excess amount of refrigerant is detected in the first heat source unit, other-unit startup control or refrigerant accumulation control is carried out in the heat source unit for which a refrigerant accumulation-processed flag has not been set rather than being carried out in a heat source unit in which the flag has been set. The continuation of operation of the first heat source unit in a state in which excess refrigerant is present can thereby be resolved at an earlier stage.

The heat source unit of an air conditioner according to an eleventh aspect is a unit in which another heat source unit and a utilization unit are connected to form a single main refrigerant circuit, and in which heat exchange is performed between the air in the target air-conditioning space and the utilization-side heat exchanger of the utilization unit.

The heat source unit is provided with a compressor, a heat source-side heat exchanger, an accumulator, and a controller. The controller performs other-unit startup control for starting up the other heat source unit in a stopped state, or performs other-unit refrigerant accumulation control for accumulating a refrigerant in the other heat source unit in an operating state in the accumulator of the other heat source unit, when the amount of refrigerant is determined to be excessive.

In this case, the refrigerant compressed by the compressor flows through the main refrigerant circuit, heat is exchanged with the utilization-side heat exchanger, and air is conditioned. Control is carried out for starting up another heat source unit in a stopped state or control (other-unit refrigerant accumulation control) is carried out for accumulating refrigerant in the accumulator in the other heat source unit, when the amount of refrigerant during operation is excessive. In accordance with the former other-unit startup control, the refrigerant is moved from the heat source unit in which refrigerant is excessive to the other heat source unit by setting the other heat source unit in an operating state. Air is conditioned by the other heat source unit by using the other-unit startup control, the heat source unit in which the refrigerant has become excessive is stopped, and the movement of the refrigerant from the heat source unit to the other heat source unit is facilitated. The refrigerant can be moved from the heat source unit to the other heat source unit when the other-unit refrigerant accumulation control is to be performed. Therefore, with the heat source unit according to the eleventh aspect, it is possible to reduce situations in which excess refrigerant pools in a heat source unit and smooth operation is disrupted, even in cases in which the capacity of the accumulator is relatively small.

The heat source unit according to the twelfth aspect is the heat source unit according to the eleventh aspect, wherein the controller first performs selfsame-unit refrigerant accumulation control for accumulating a refrigerant in the accumulator when prescribed refrigerant accumulation conditions have been realized, and performs the other-unit startup control or the other-unit refrigerant accumulation control when the amount of refrigerant is determined to be excessive during the selfsame-unit refrigerant accumulation control.

In this case, first, selfsame-unit refrigerant accumulation control for accumulating a refrigerant in the accumulator is carried out on the basis of prescribed refrigerant accumulation conditions in the selfsame unit (heat source unit) prior to the execution of other-unit startup control or other-unit refrigerant accumulation control. Accordingly, the amount of refrigerant can be adjusted by first directing excess refrigerant to the accumulator when the excess refrigerant has been generated, and the number of times that another heat source unit is affected can be reduced.

Effects of the Invention

In accordance with the first aspect, a refrigerant can be moved from the first heat source unit in which the refrigerant has become excessive to another heat source unit by performing other-unit startup control or refrigerant accumulation control in another heat source unit, and situations can be reduced in which excess refrigerant pools in the first heat source unit and smooth operation is disrupted, even in cases in which the capacity of the accumulator is relatively small.

In accordance with the second, seventh, and eighth aspects, since excess refrigerant is first directed to an accumulator to adjust the amount of refrigerant when the excess refrigerant has been produced, the number of times that another heat source unit is affected can be reduced.

In accordance with the third aspect, excess liquid refrigerant can thereby be reliably accumulated in the accumulator.

In accordance with the fourth aspect, a liquid refrigerant can be supercooled using the bypass refrigerant circuit that directs excess liquid refrigerant to the accumulator.

In accordance with the fifth and sixth aspects, a malfunction can be prevented in which operation is carried out with excess refrigerant in the first heat source unit and refrigerant in a gas-liquid two-phase state is drawn into the compressor.

In accordance with the ninth and tenth aspects, the continuation of operation of the first heat source unit in a state in which excess refrigerant is present can thereby be resolved at an earlier stage.

In accordance with the eleventh aspect, a refrigerant can be moved from a heat source unit in which the refrigerant has become excessive to another heat source unit by performing other-unit startup control or other-unit refrigerant accumulation control, making it possible to reduce situations in which excess refrigerant pools in the heat source unit and smooth operation is disrupted, even in cases in which the capacity of the accumulator is relatively small.

In accordance with the twelfth aspect, since the amount of refrigerant is adjusted by first directing excess refrigerant to the accumulator of the selfsame unit when excess refrigerant has been generated, the number of times that another heat source unit is affected can be reduced.

DETAILED DESCRIPTION OF THE INVENTION

<Configuration of the Air Conditioner>

Figure 1:
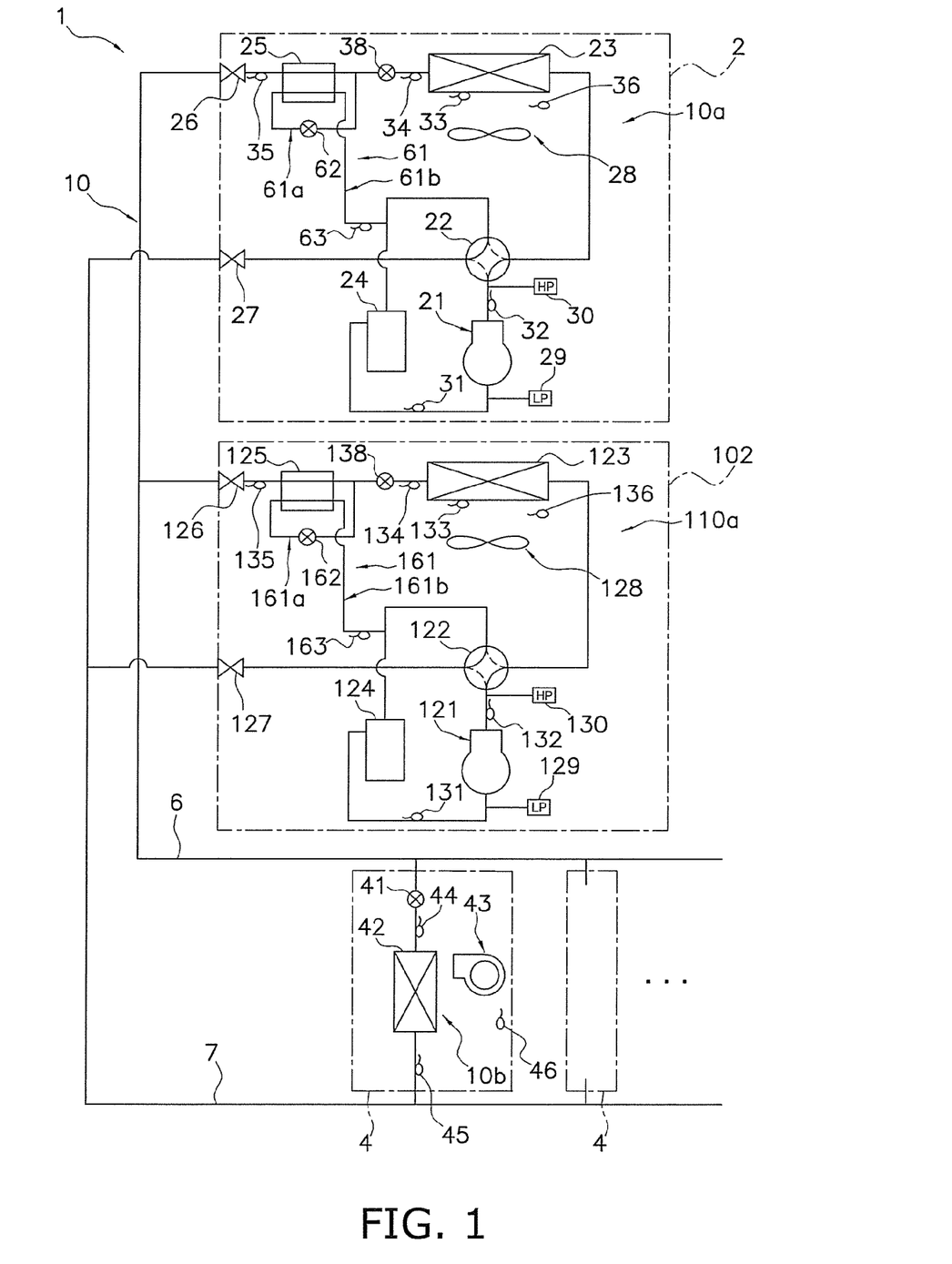
FIG. 1 is a schematic structural diagram of an air conditioner provided with a heat source unit according to an embodiment of the present invention.

The air conditioner 1 according to an embodiment of the present invention is shown in FIG. 1. The air conditioner 1 is a device used in cooling and heating the inside of buildings or the like by carrying out a vapor compression-type refrigeration cycle operation. The air conditioner 1 is mainly provided with outdoor units 2, 102 as a plurality of heat source units (two units in FIG. 1), an indoor unit 4 as one of a plurality of utilization units connected in parallel to the outdoor units, and a liquid refrigerant communication pipe 6 and gas refrigerant communication pipe 7 as refrigerant communication pipes that connect the outdoor units 2, 102 and the indoor unit 4. In other words, a vapor compression-type refrigerant circuit 10 of the air conditioner 1 of the present embodiment is configured by connecting the outdoor units 2, 102, the indoor unit 4, the liquid refrigerant communication pipe 6, and the gas refrigerant communication pipe 7.

<Indoor Units>

Each of the indoor units 4 is disposed by being embedded in, hung from, or otherwise provided to the ceiling inside a building or the like, or by being mounted on or otherwise provided to an indoor wall surface. The indoor unit 4 is connected to the outdoor units 2, 102 via the liquid refrigerant communication pipe 6 and the gas refrigerant communication pipe 7, and constitutes a part of the refrigerant circuit 10.

Next, the configuration of the indoor unit 4 will be described. The indoor unit 4 mainly has an indoor-side refrigerant circuit 10b that constitutes a portion of the refrigerant circuit 10. The indoor-side refrigerant circuit 10b mainly includes an indoor expansion valve 41 as an expansion mechanism, and an indoor heat exchanger 42 as a utilization-side heat exchanger.

In the present embodiment, the indoor expansion valve 41 is an electrically driven expansion valve connected to the liquid side of the indoor heat exchanger 42 in order to adjust the flow rate of the refrigerant that flows through the indoor-side refrigerant circuit 10b.

In the present embodiment, the indoor heat exchanger 42 is a cross-fin-type, fin-and-tube heat exchanger composed of a heat transfer pipe and numerous fins, functions as a refrigerant evaporator to cool indoor air during cooling operation, and functions as a refrigerant condenser for heating indoor air during heating operation.

In the present embodiment, the indoor unit 4 has an indoor fan 43. The indoor fan 43 draws indoor air into the unit, exchanges heat with the refrigerant in the indoor heat exchanger 42, and thereafter supplies the air indoors as air supply. The indoor fan 43 is a fan that can vary the quantity of air to be fed to the indoor heat exchanger 42. In the present embodiment, the fan is a centrifugal fan, a multi-vane fan, or the like driven by a DC fan motor.

Various sensors are disposed in the indoor unit 4. A liquid-side temperature sensor 44 for detecting the temperature of the refrigerant (i.e., the refrigerant temperature that corresponds to the condensing temperature during heating operation, or the evaporation temperature during cooling operation) is provided to the liquid side of the indoor heat exchanger 42. A gas-side temperature sensor 45 for detecting the temperature of the refrigerant is provided to the gas side of the indoor heat exchanger 42. An indoor air temperature sensor 46 for detecting the temperature of indoor air (i.e., the room temperature) that flows into the unit is provided to the indoor air intake port side of the indoor unit 4. In the present embodiment, the liquid-side temperature sensor 44, the gas-side temperature sensor 45, and the indoor air temperature sensor 46 are composed of a thermistor. Also, the indoor unit 4 has an indoor unit controller 50c (see FIG. 2) for controlling the operation of each part constituting the indoor unit 4. The indoor unit controller 50c has a microcomputer, memory, and the like provided for controlling the indoor unit 4, and can exchange control signals or the like with a remote control (not shown) for separately operating indoor units 4, and exchange control signals or the like between a first outdoor unit controller 50a and a second outdoor unit controller 50b shown in FIG. 2 via a transmission line (not shown).

<Outdoor Units>

The outdoor units 2, 102 are disposed outside of a building or the like, are connected to the indoor unit 4 via the liquid refrigerant communication pipe 6 and the gas refrigerant communication pipe 7, and, together with the indoor unit 4, constitute a refrigerant circuit 10.

Next, the configuration of the outdoor units 2, 102 will be described. Since the first outdoor unit 2 and the second outdoor unit 102 have the same configuration, only the configuration of the first outdoor unit 2 will be described herein. The configuration of the second outdoor unit 102 is obtained by adding 100 to the reference numeral of each part of the first outdoor unit 2 and substituting the reference numeral, and a description thereof is omitted.

The first outdoor unit 2 mainly has an outdoor-side refrigerant circuit 10a that constitutes a part of the refrigerant circuit 10. The outdoor-side refrigerant circuit 10a mainly has a compressor 21, a four-way switching valve 22, an outdoor heat exchanger 23 as a heat source-side heat exchanger, an outdoor expansion valve 38 as an expansion mechanism, an accumulator 24, a supercooler 25 as a temperature control mechanism, a liquid-side stop valve 26, and a gas-side stop valve 27.

The compressor 21 is a compressor that can vary operating capacity and, in the present embodiment, is a variable-capacity compressor driven by a motor in which the rotational speed is controlled by an inverter. Only one compressor 21 is shown in FIG. 1, but in reality, two or more compressors are connected in parallel. The compressor 21 may be composed of a single compressor, as shown in FIG. 1.

The four-way switching valve 22 is a valve for switching the direction of the flow of the refrigerant. During cooling operation, the valve causes the outdoor heat exchanger 23 to function as a condenser of the refrigerant compressed by the compressor 21, and the indoor heat exchanger 42 to function as an evaporator of the refrigerant condensed in the outdoor heat exchanger 23. The four-way switching valve 22 connects the discharge side of the compressor 21 and the gas side of the outdoor heat exchanger 23, and the intake side (specifically, accumulator 24) of the compressor 21 and the side of the gas refrigerant communication pipe 7 (see the solid line of four-way switching valve 22 of FIG. 1). During heating operation, the valve causes the indoor heat exchanger 42 to function as a condenser of the refrigerant compressed by the compressor 21, and the outdoor heat exchanger 23 to function as an evaporator of the refrigerant condensed in the indoor heat exchanger 42. Also, the four-way switching valve 22 can connect the discharge side of the compressor 21 and the side of the gas refrigerant communication pipe 7, and the intake side of the compressor 21 and the gas side of the outdoor heat exchanger 23 (see the broken line of the four-way switching valve 22 in FIG. 1).

In the present embodiment, the outdoor heat exchanger 23 is a cross-fin-type, fin-and-tube heat exchanger composed of a heat transfer pipe and numerous fins, functions as a refrigerant condenser during cooling operation, and functions as a refrigerant evaporator during heating operation. The gas side of the outdoor heat exchanger 23 is connected to the four-way switching valve 22 and the liquid side is connected to the liquid refrigerant communication pipe 6.

In the present embodiment, the outdoor expansion valve 38 is an electrically driven expansion valve connected to the liquid side of the outdoor heat exchanger 23 in order to adjust the pressure, the flow rate, and the like of the refrigerant that flows through the outdoor-side refrigerant circuit 10a.

In the present embodiment, the outdoor unit 2 has an outdoor fan 28. The outdoor fan 28 draws outdoor air into the unit, exchanges heat with the refrigerant in the outdoor heat exchanger 23, and thereafter expels the air outdoors. The outdoor fan 28 is a fan that can vary the quantity of air to be fed to the outdoor heat exchanger 23, and is a propeller fan or the like driven by a DC fan motor in the present embodiment.

The accumulator 24 is connected between the four-way switching valve 22 and the compressor 21, and is a container that can accumulate excess refrigerant generated inside the refrigerant circuit 10 in accordance with fluctuations or the like in the operational load of the indoor unit 4. Also, the accumulator 24 separates liquid refrigerant and gas refrigerant and draws in only gas refrigerant into the compressor 21, draws a liquid mixture composed of refrigerant and refrigeration machine oil accumulated at the bottom into the compressor 21 via an oil return pipe (not shown), and keeps the amount of oil required for lubrication inside the compressor 21 at a suitable level.

In the present embodiment, the supercooler 25 is a double-pipe heat exchanger capable of cooling the refrigerant that has be condensed in the outdoor heat exchanger 23 and thereafter sent to the indoor expansion valve 41 via the liquid refrigerant communication pipe 6. The supercooler 25 is interposed between the outdoor expansion valve 38 and the liquid-side stop valve 26 in the present embodiment.

In the present embodiment, a bypass refrigerant circuit 61 acting as a cooling source of the supercooler 25 is provided. In the description below, the portion excluding the bypass refrigerant circuit 61 from the refrigerant circuit 10 will be referred to as the main refrigerant circuit for the sake of convenience.

The bypass refrigerant circuit 61 is connected to the main refrigerant circuit so as to cause a portion of the refrigerant sent from the outdoor heat exchanger 23 to the indoor expansion valve 41 to branch from the main refrigerant circuit and return to the intake side of the compressor 21. Specifically, the bypass refrigerant circuit 61 has a branching circuit 61a and a merging circuit 61b. The branching circuit 61a causes a portion of the refrigerant send from the outdoor expansion valve 38 to the indoor expansion valve 41 to branch from a position between the outdoor heat exchanger 23 and the supercooler 25. The merging circuit 61b is connected to the intake side of the compressor 21 so as to return refrigerant to the intake side of the compressor 21 from the outlet of the supercooler 25 on the side of the bypass refrigerant circuit 61. A bypass valve 62 for adjusting the flow rate of the refrigerant that flows through the bypass refrigerant circuit 61 is provided to the branching circuit 61a. In this case, the bypass valve 62 is composed of an electrically driven expansion valve. The refrigerant sent from the outdoor heat exchanger 23 to the indoor expansion valve 41 is thereby reduced in pressure by the bypass valve 62 and is cooled by the refrigerant that flows through the bypass refrigerant circuit 61. In other words, the supercooler 25 controls capacity by adjusting the aperture of the bypass valve 62.

The bypass refrigerant circuit 61 is also used in later-described accumulator refrigerant accumulation control, and acts to move excess refrigerant to the accumulator 24.

The liquid-side stop valve 26 and gas-side stop valve 27 are valves provided to connection ports with external equipment and piping (specifically, liquid refrigerant communication pipe 6 and gas refrigerant communication pipe 7). The liquid-side stop valve 26 is connected to the outdoor heat exchanger 23. The gas-side stop valve 27 is connected to the four-way switching valve 22.

Various sensors are provided to the outdoor unit 2. Specifically, the outdoor unit 2 is provided with an intake pressure sensor 29 for detecting the intake pressure of the compressor 21, a discharge pressure sensor 30 for detecting the discharge pressure of the compressor 21, an intake temperature sensor 31 for detecting the intake temperature of the compressor 21, and a discharge temperature sensor 32 for detecting the discharge temperature of the compressor 21. The intake temperature sensor 31 is disposed in a position between the accumulator 24 and the compressor 21. The outdoor heat exchanger 23 is provided with a heat exchanger temperature sensor 33 for detecting the temperature (i.e., the refrigerant temperature that corresponds to the condensing temperature during cooling operation or the evaporation temperature during heating operation) of the refrigerant that flows through the outdoor heat exchanger 23. A liquid-side temperature sensor 34 for detecting the temperature Tb of the refrigerant is provided to the liquid side of the outdoor heat exchanger 23. A liquid pipe temperature sensor 35 for detecting the temperature (i.e., the liquid pipe temperature) of the refrigerant is provided to the outlet of the main refrigerant circuit side of the supercooler 25. A bypass temperature sensor 63 for detecting the temperature of the refrigerant that flows through the outlet of the supercooler 25 on the side of the bypass refrigerant circuit 61 is provided to the merging circuit 61b of the bypass refrigerant circuit 61. An outside-air temperature sensor 36 for detecting the temperature of the outside air that flows into the unit is provided to the side of the outdoor unit 2 on which the intake port for outside air is positioned. In the present embodiment, the intake temperature sensor 31, the discharge temperature sensor 32, the heat exchanger temperature sensor 33, the liquid-side temperature sensor 34, the liquid pipe temperature sensor 35, the outside-air temperature sensor 36, and the bypass temperature sensor 63 are composed of a thermistor. Also, the outdoor unit 2 has a first outdoor unit controller 50a (see FIG. 2) for controlling the operation of each part constituting the outdoor unit 2. The first outdoor unit controller 50a has a microcomputer, memory, an inverter circuit for controlling the motor of the compressor 21, and other components provided for controlling the outdoor unit 2, and can exchange control signals or the like via a transmission line with the indoor unit controller 50c of the indoor unit 4. In other words, a controller 50 for controlling the operation of the entire air conditioner 1 is composed of the indoor unit controller 50c, the first outdoor unit controller 50a (and the second outdoor unit controller 50b), and a transmission line, as shown in FIG. 2.

<Controller>

Figure 2:
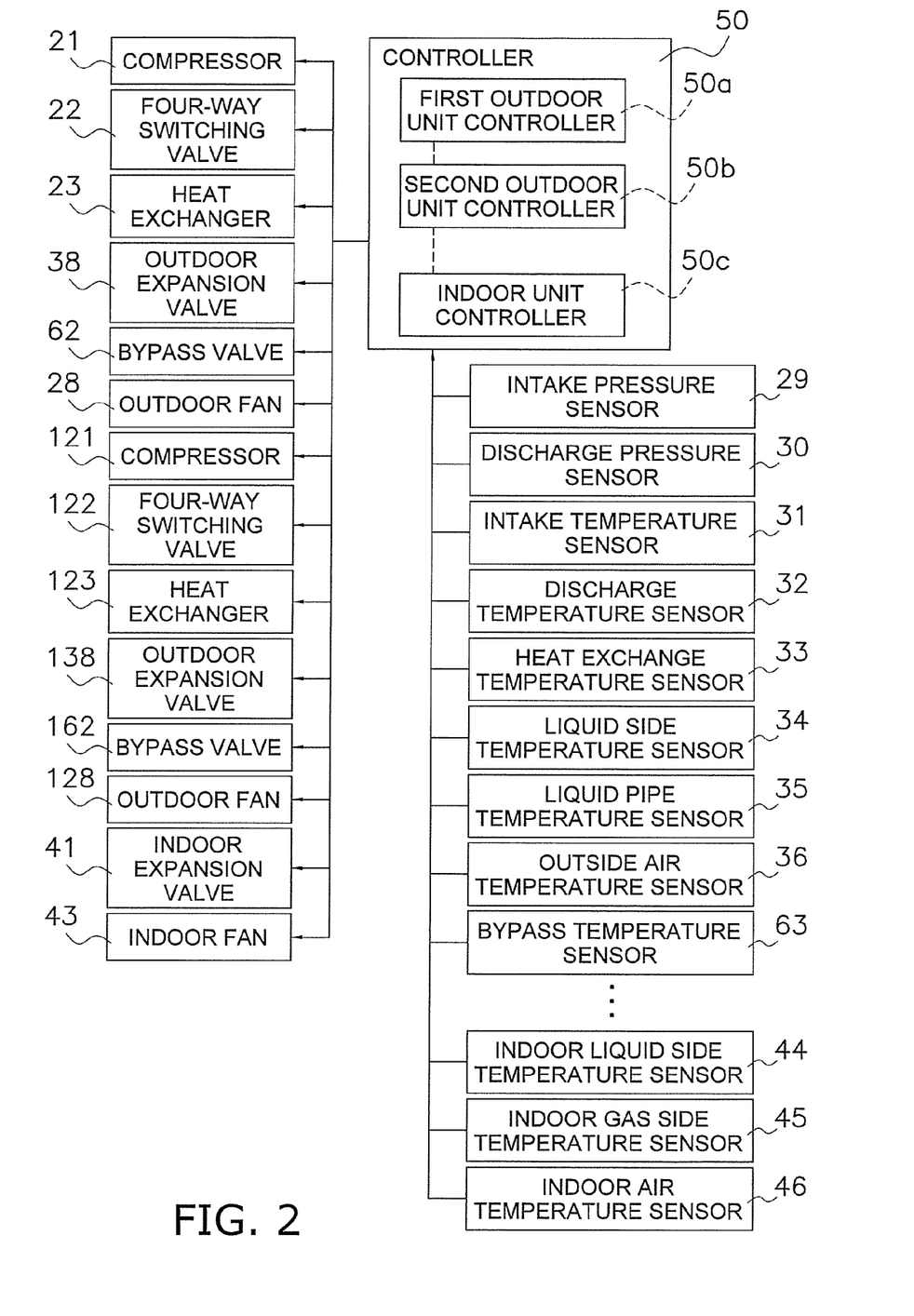
FIG. 2 is a control block diagram of the air conditioner.

The controller 50 is connected so as to be capable of receiving the detection signals of sensors 29 to 36, 44 to 46, and 63, as shown in FIG. 2, and is connected to various equipment and valves so as to be capable of controlling various equipment and the valves 21, 22, 38, 41, 62, and the like on the basis of these detection signals or the like.

<Operation of the Air Conditioner>

The operation of the air conditioner 1 according to the present embodiment will be described next.

<Cooling Operation>

First, the cooling operation will be described with reference to FIG. 1.

During cooling operation, the four-way switching valves 22 and 122 are in the state indicated by the solid lines of FIG. 1, i.e., a state in which the discharge sides of the compressors 21, 121 are connected to the gas side of the outdoor heat exchangers 23, 123; and the intake sides of the compressors 21, 121 are connected to the gas side of each of the indoor heat exchangers 42 via the gas refrigerant communication pipe 7. The outdoor expansion valves 38, 138 are completely open. The aperture of each indoor expansion valve 41 is set so that the degree of superheat of the refrigerant at the outlet of the indoor heat exchanger 42 (i.e., the gas side of the indoor heat exchanger 42) is constant at the target degree of superheat.

In the present embodiment, the degree of superheat of the refrigerant at the outlet of each of the indoor heat exchangers 42 is detected by subtracting the refrigerant temperature value (corresponding to the evaporation temperature) detected by the liquid-side temperature sensor 44 from the refrigerant temperature value detected by the gas-side temperature sensor 45, or by converting the intake pressure of the compressors 21, 121 detected by the intake pressure sensors 29, 129 to the saturation temperature value that corresponds to the evaporation temperature, and subtracting the saturation temperature value of the refrigerant from the refrigerant temperature value detected by the gas-side temperature sensor 45. Although not adopted in the present embodiment, a technique may be used in which a temperature sensor for detecting the temperature of the refrigerant that flows through each of the indoor heat exchangers 42 is provided, and the degree of superheat of the refrigerant at the outlet of each of the indoor heat exchangers 42 is detected by subtracting the refrigerant temperature value that corresponds to the evaporation temperature detected by the temperature sensor from the refrigerant temperature value detected by the gas-side temperature sensor 45.

The apertures of the bypass valves 62, 162 are adjusted so that the degree of superheat of the refrigerant at the outlets of the supercoolers 25, 125 on the side of the bypass refrigerant circuits 61, 161 is set to a target degree of superheat. In the present embodiment, the degree of superheat of the refrigerant at the outlets of the supercoolers 25, 125 on the side of the bypass refrigerant circuits 61, 161 is detected by converting the intake pressure of the compressors 21, 121 detected by the intake pressure sensors 29, 129 to the saturation temperature value that corresponds to the evaporation temperature, and subtracting the saturation temperature value of the refrigerant from the refrigerant temperature value detected by the bypass temperature sensors 63, 163. Although not adopted in the present embodiment, a technique may be used in which a temperature sensor is provided to the inlet of the supercoolers 25, 125 on the side of the bypass refrigerant circuits 61, 161, and the degree of superheat of the refrigerant at the outlet of the supercoolers 25, 125 on the side of the bypass refrigerant circuits 61, 161 is detected by subtracting the refrigerant temperature value detected by the temperature sensor from the refrigerant temperature value detected by the bypass temperature sensors 63, 163.

When the compressors 21, 121, the outdoor fans 28, 128, and the indoor fan 43 are started up in this state of the refrigerant circuit 10, the low-pressure gas refrigerant is taken into the compressors 21, 121 and compressed to obtain a high-pressure gas refrigerant. Thereafter, the high-pressure gas refrigerant is sent to the outdoor heat exchangers 23, 123 by way of the four-way switching valves 22, 122, caused to exchange heat with the outside air supplied by the outdoor fans 28, 128 and condensed to obtain high-pressure liquid refrigerant. The high-pressure liquid refrigerant passes through the outdoor expansion valves 38, 138, flows into the supercoolers 25, 125, exchanges heat with the refrigerant that flows through the bypass refrigerant circuits 61, 161, and further cools to a supercooled state. At this point, a portion of the high-pressure liquid refrigerant condensed in the outdoor heat exchangers 23, 123 is branched off to the bypass refrigerant circuits 61, 161, is reduced in pressure by the bypass valves 62, 162, and is thereafter returned to the intake side of the compressors 21, 121. In this case, the refrigerant that passes through the bypass valves 62, 162 is reduced in pressure to near the intake pressure of the compressors 21, 121, whereby a portion of the refrigerant evaporates. The refrigerant that flows from the outlet of the bypass valves 62, 162 of the bypass refrigerant circuits 61, 161 toward the intake side of the compressors 21, 121 passes through the supercoolers 25, 125 and exchanges heat with high-pressure liquid refrigerant sent to the indoor unit 4 from the outdoor heat exchangers 23, 123 on the side of the main refrigerant circuit. The high-pressure liquid refrigerant in a supercooled state is sent to the indoor unit 4 by way of the liquid refrigerant communication pipe 6. The high-pressure liquid refrigerant sent to the indoor unit 4 is reduced in pressure to near the intake pressure of the compressors 21, 121 by the indoor expansion valve 41, forms a low-pressure gas-liquid two-phase state, proceeds to the indoor heat exchanger 42, exchanges heat with indoor air in the indoor heat exchanger 42, evaporates, and forms low-pressure gas refrigerant.

The low-pressure gas refrigerant proceeds to the outdoor units 2, 102 by way of the gas refrigerant communication pipe 7, passes through the four-way switching valves 22, 122, and flows into the accumulators 24, 124. The low-pressure gas refrigerant that has flowed into the accumulators 24, 124 is again taken into the compressors 21, 121.

<Heating Operation>

Next, the heating operation will be described.

During heating operation, the four-way switching valves 22 and 122 are in the state indicated by the broken lines of FIG. 1, i.e., a state in which the discharge sides of the compressors 21, 121 are connected to the gas side of the indoor heat exchanger 42 via the gas refrigerant communication pipe 7, and the intake sides of the compressors 21, 121 are connected to the gas side of the outdoor heat exchangers 23, 123. The apertures of the outdoor expansion valves 38, 138 are adjusted in order to reduce the pressure to a level (i.e., evaporative pressure) that allows the refrigerant that flows into the outdoor heat exchangers 23, 123 to evaporate in the outdoor heat exchangers 23, 123. The aperture of the indoor expansion valve 41 is set so that the degree of supercooling of the refrigerant at the outlet of the indoor heat exchanger 42 is constant at a target degree of supercooling.

In the present embodiment, the degree of supercooling of the refrigerant at the outlet of the indoor heat exchanger 42 is detected by converting the discharge pressure of the compressors 21, 121 detected by the discharge pressure sensors 30, 130 to a saturation temperature value that corresponds to the condensing temperature, and subtracting the refrigerant temperature value detected by the liquid-side temperature sensor 44 from the saturation temperature value of the refrigerant. Although not adopted in the present embodiment, a technique may be used in which a temperature sensor for detecting the temperature of the refrigerant that flows through each indoor heat exchanger 42 is provided, and the degree of supercooling of the refrigerant at the outlet of the indoor heat exchanger 42 is detected by subtracting the refrigerant temperature value that corresponds to the condensing temperature detected by the temperature sensor from the refrigerant temperature value detected by the liquid-side temperature sensor 44. Also, the bypass valves 62, 162 are closed.

In this state of the refrigerant circuit 10, when compressors 21, 121, the outdoor fans 28, 128, and the indoor fan 43 are started up, the low-pressure gas refrigerant is taken into the compressors 21, 121 and compressed to obtain a high-pressure gas refrigerant, which is sent to the indoor unit 4 by way of the four-way switching valves 22, 122 and the gas refrigerant communication pipe 7.

The high-pressure gas refrigerant sent to the indoor unit 4 exchanges heat with outside air in the indoor heat exchanger 42 and is condensed to form high-pressure liquid refrigerant, which is thereafter reduced in pressure in accordance with the aperture of the indoor expansion valve 41 while passing through the indoor expansion valve 41.

The refrigerant that has passed through the indoor expansion valve 41 is sent to the outdoor units 2, 102 by way of the liquid refrigerant communication pipe 6, is further reduced in pressure by way of the supercoolers 25, 125 and the outdoor expansion valves 38, 138, and is thereafter made to flow into the outdoor heat exchangers 23, 123. The low-pressure refrigerant that has flowed into the outdoor heat exchangers 23, 123 in a gas-vapor two-phase state exchanges heat with outdoor air supplied by the outdoor fans 28, 128, evaporates, forms a low-pressure gas refrigerant, and flows into the accumulators 24, 124 by way of the four-way switching valves 22, 122. The low-pressure gas refrigerant that has flowed into the accumulators 24, 124 is again taken into the compressors 21, 121.

<Excess Refrigerant Control During Cooling Operation>

With the air conditioner 1 according to the present embodiment, the accumulation of excess refrigerant in the accumulators 24, 124 is controlled via the bypass refrigerant circuits 61, 161 when the excess refrigerant is generated during cooling. The excess refrigerant control during cooling operation will be described below with reference to FIG. 3. Each step is carried out by the controller 50.

Figure 3:
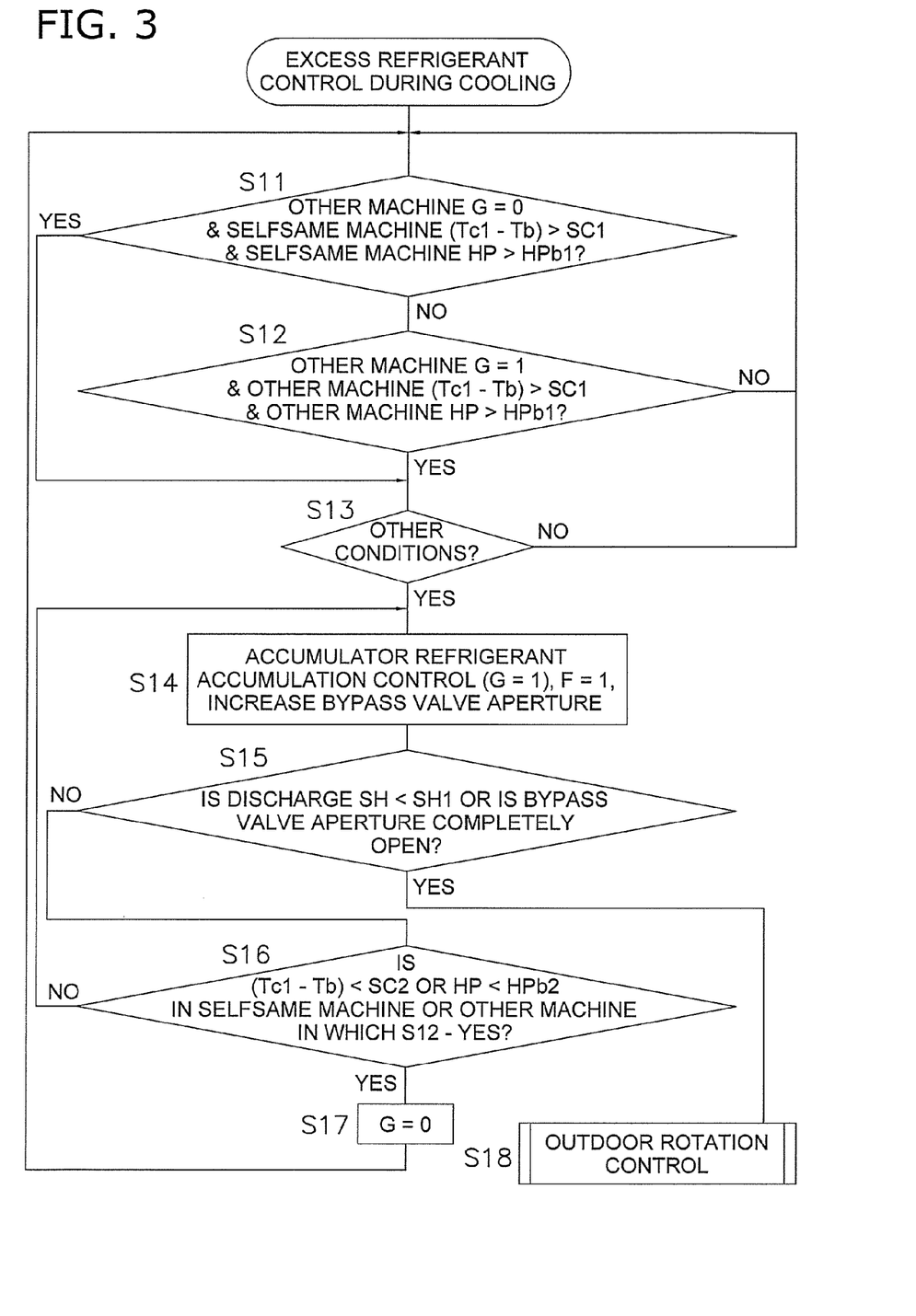
FIG. 3 is a flowchart of excess refrigerant control during cooling.

First, in step S11, it is determined whether three prescribed conditions have been satisfied. The first condition is the condition that a flag G of another outdoor unit (referred to as other machine in the diagram) be 0. The flag G is set to 1 when a later-described accumulator refrigerant accumulation control (steps S14 to S16) is being executed, and is set to 0 when such control is not being executed. The second condition is a condition in which the difference between the liquid coolant saturation temperature Tc1 of the outdoor unit itself (referred to as selfsame machine in the diagram) and the liquid refrigerant temperature Tb of the outdoor heat exchangers 23, 123, i.e., the degree of supercooling in the liquid side of the outdoor heat exchangers 23, 123, be greater than a prescribed value SC1. Liquid refrigerant temperature Tb is a detection value of the liquid-side temperature sensor 34 disposed on the liquid side of the outdoor heat exchangers 23, 123. The third condition is a condition in which the high-pressure HP of the outdoor unit itself has exceeded a prescribed value HPb1. The high pressure HP is a detection value of the discharge pressure sensors 30, 130 for detecting the discharge pressure of the compressors 21, 121. The second and third conditions are conditions that come about when a considerable amount of refrigerant has accumulated in the outdoor heat exchangers 23, 123. In step S11, the process proceeds to step S13 when these three conditions have been satisfied, and the process proceeds to step S12 when these three conditions have not been satisfied.

In step S12, it is determined whether three conditions different from those of step S11 have been satisfied. The first condition is a condition in which the flag G of another indoor unit is at 1, i.e., a condition in which the accumulator refrigerant accumulation control has been carried out in another indoor unit. The second condition is a condition in which the difference between the liquid refrigerant saturation temperature Tc1 of another outdoor unit and liquid refrigerant temperature Tb of the outdoor heat exchangers 23, 123, i.e., the degree of supercooling in the liquid side of the outdoor heat exchangers 23, 123 is greater than the prescribed value SC1. The third condition is a condition in which the high-pressure HP of another outdoor unit has exceeded a prescribed value HPb1. The second and third conditions are conditions that come about when a considerable amount of refrigerant has accumulated in the outdoor heat exchangers 23, 123 in another outdoor unit. In step S12, the process proceeds to step S13 when these three conditions have been satisfied, and the process returns to step S11 when these three conditions have not been satisfied.

In step S13, it is determined whether other conditions for proceeding to accumulator refrigerant accumulation control in step S14 and thereafter has been satisfied. Specifically, a determination is made in step S13 that accumulator refrigerant accumulation control must not be carried out in cases in which a prescribed time after startup has not elapsed, those in which a prescribed time after oil return operation has not elapsed, those in which an automatic refrigerant charging operation is being carried out, those in which a test operation is being carried out, those in which refrigerant leakage detection operation is being carried out, or the like. In such cases, the process returns to step S11.

In step S13, when it has been determined that accumulator refrigerant accumulation control may be carried out, the process proceeds to step S14. In step S14, a flag G signifying that accumulator refrigerant accumulation control is ongoing is set to 1, and a flag F signifying a history that accumulator refrigerant accumulation control has been carried out is set to 1. The aperture of the bypass valves 62, 162 of the bypass refrigerant circuits 61, 161 for directing the liquid refrigerant from between the outdoor heat exchangers 23, 123 and the supercoolers 25, 125 to the accumulators 24, 124 is increased by a prescribed aperture amount from the current aperture. The aperture of the bypass valves 62, 162 is repeatedly increased at prescribed time intervals. The determinations of step S15 and step S16 are carried out during such intervals, and the process exits the loop of steps S14 to S16 when prescribed conditions have been reached.

In step S15, it is determined whether one of the two conditions has been satisfied. The first condition is a condition that the degree of superheat SH (hereinafter referred to as "discharge SH") of the gas refrigerant on the discharge side of the compressors 21, 121 be less than the prescribed value SH1. The second condition is a condition that the bypass valves 62, 162 be completely open. In step S15, when either of the conditions has been satisfied, and it has been determined to be difficult to adjust the excess refrigerant by merely carrying out accumulator refrigerant accumulation control in the outdoor unit itself, the flag G related to execution of accumulator refrigerant accumulation control is set to 0 and the process proceeds to outdoor rotation control (described below) of step S18. On the other hand, when the two conditions of step S15 have not been satisfied, it is determined that excess refrigerant can still be further adjusted by the accumulators 24, 124 and the process proceeds to step S16.

In step S16, when the prescribed conditions of step S11 have been satisfied and the process has proceeded to step S14, and when prescribed conditions of step S12 have been satisfied in the outdoor unit itself and the process has proceeded to step S14, it is determined whether the following two conditions have been satisfied in another outdoor unit in which such conditions have been satisfied. The first condition is a condition in which the difference between the liquid refrigerant saturation temperature Tc1 and the liquid refrigerant temperature Tb of the outdoor heat exchangers 23, 123, i.e., the degree of supercooling in the liquid side of the outdoor heat exchangers 23, 123, is less than a prescribed value SC2. The prescribed value SC2 is a value that is less than the prescribed value SC1 described above. The second condition is a condition that the high-pressure HP be less that a prescribed value HPb2. The prescribed value HPb2 is a value that is less than the prescribed value HPb1 described above. When any of these conditions has been satisfied, it is determined that stagnation (pooling) of refrigerant in the outdoor heat exchangers 23, 123 has been resolved, and the process exits from accumulator refrigerant accumulation control and returns to step S11 via step S17. In step S17, the flag G related to the execution of accumulator refrigerant accumulation control is set to 0. On the other hand, when any of the conditions of step S16 are not satisfied, the process returns to step S14 because accumulator refrigerant accumulation control must be continued and refrigerant stagnation must be resolved in the outdoor heat exchangers 23, 123.

<Excess Refrigerant Control During Heating Operation>

With the air conditioner 1 according to the present embodiment, the accumulation of excess refrigerant in the accumulators 24, 124 is controlled via the bypass refrigerant circuits 61, 161 when the excess refrigerant is generated during heating. Excess refrigerant control during heating operation will be described below with reference to FIG. 4. Each step is carried out by the controller 50.

Figure 4:
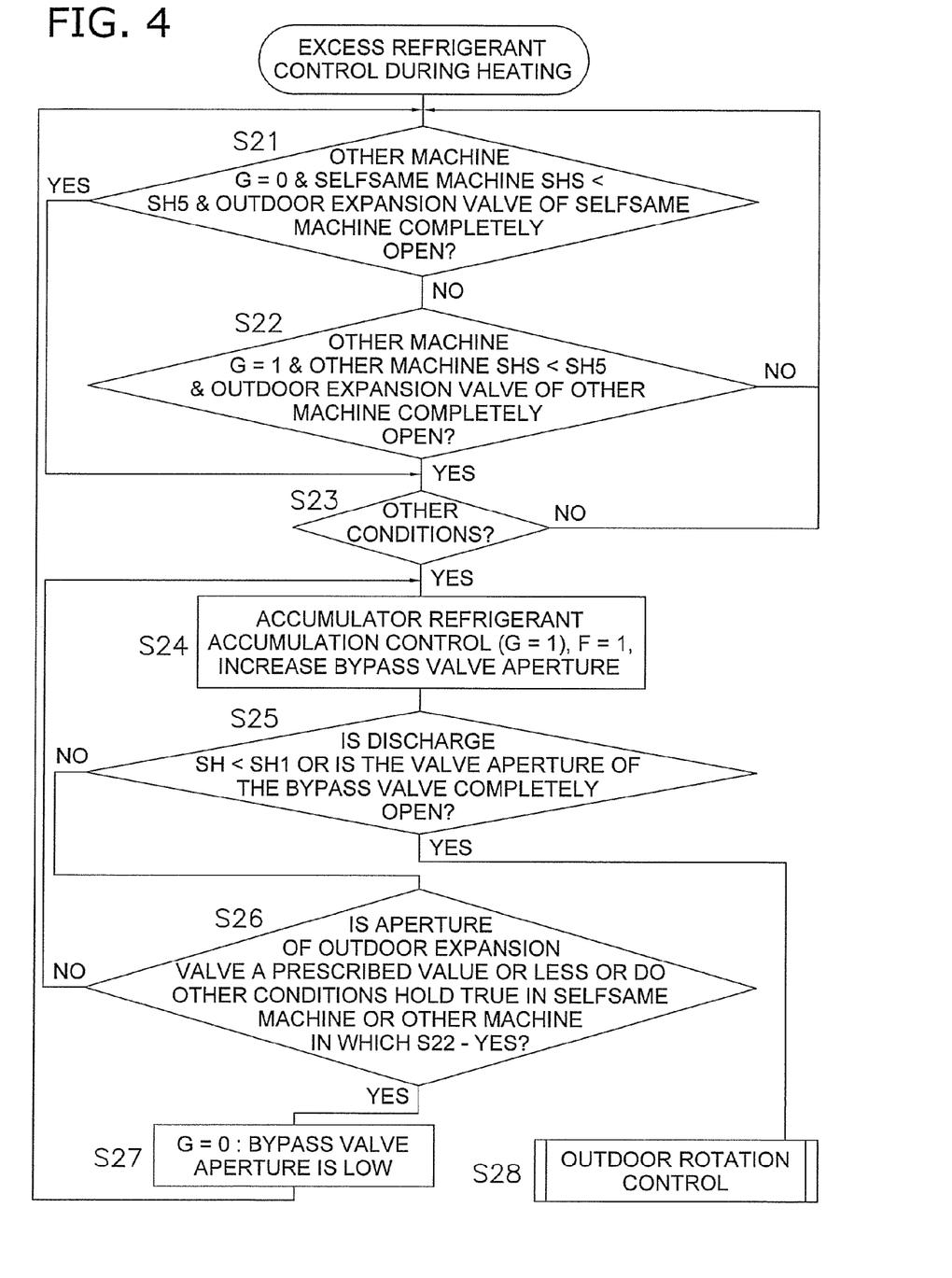
FIG. 4 is a flowchart of excess refrigerant control during heating.

First, in step S21, it is determined whether three prescribed conditions have been satisfied. The first condition is the condition that the flag G of another outdoor unit be 0. The second condition is a condition in which a target value SHS of the degree of superheat on the intake side of the compressors 21, 121 of the outdoor unit itself be less than a prescribed value SH5. The third condition is a condition that the outdoor expansion valves 38, 138 of the outdoor unit itself be completely open. The second and third conditions are conditions that come about when excess refrigerant has pooled in the indoor heat exchanger 42 and control of the indoor expansion valve 41 has become difficult. In step S21, the process proceeds to step S23 when these three conditions have been satisfied, and the process proceeds to step S22 when these three conditions have not been satisfied.

In step S22, it is determined whether three conditions different from those of step S21 have been satisfied. The first condition is a condition in which the flag G of another indoor unit is 1, i.e., a condition in which the accumulator refrigerant accumulation control has been carried out in another outdoor unit. The second condition is a condition in which the target value SHS of the degree of superheat on the intake side of the compressors 21, 121 of another outdoor unit is less than the prescribed value SH5. The third condition is a condition that the outdoor expansion valves 38, 138 of another outdoor unit be completely open. The second and third conditions are conditions that come about when excess refrigerant has pooled in the indoor heat exchanger 42 and control of the indoor expansion valve 41 has become difficult. In step S22, the process proceeds to step S23 when these three conditions have been satisfied, and the process returns to step S21 when these three conditions have not been satisfied.

In step S23, it is determined whether other conditions have been satisfied in order to carry out accumulator refrigerant accumulation control of step S24 and thereafter. Specifically, it is determined in step S23 that accumulator refrigerant accumulation control must not be carried out in cases in which a prescribed time has not elapsed after startup, those in which a prescribed time after oil return operation has not elapsed, those in which a prescribed time after defrost operation has not elapsed, or the like. In such a case, the process returns to step S21.

In step S23, when it has been determined that accumulator refrigerant accumulation control may be carried out, the process proceed to step S24. In step S24, flag G is set to 1, and flag F is set to 1, which indicates a history that accumulator refrigerant accumulation control has been carried out. The aperture of the bypass valves 62, 162 of the bypass refrigerant circuits 61, 161 for directing the liquid refrigerant from between the outdoor heat exchangers 23, 123 and the supercoolers 25, 125 to the accumulators 24, 124 is increased by a prescribed aperture amount from the current aperture. An increase in the aperture of the bypass valves 62, 162 is repeatedly carried out at prescribed time intervals. However, the determinations of step S25 and step S26 are carried out during such intervals, and the process exits the loop of steps S24 to S26 when prescribed conditions have been reached.

In step S25, it is determined whether one of the two conditions has been satisfied. The first condition is a condition that discharge SH be less than the prescribed value SH1. The second condition is a condition that the bypass valves 62, 162 be completely open. In step S25, when either of the conditions has been satisfied, and it has been determined to be difficult to adjust the excess refrigerant by merely carrying out accumulator refrigerant accumulation control in the outdoor unit itself, the flag G related to execution of accumulator refrigerant accumulation control is set to 0 and the process proceeds to outdoor rotation control (described below) of step S28. On the other hand, when the two conditions of step S25 have not been satisfied, it is determined that excess refrigerant can still be further adjusted by the accumulators 24, 124 and the process proceeds to step S26.

In step S26, when the prescribed conditions of step S21 have been satisfied and the process has proceeded to step S24, it is determined whether the outdoor expansion valves 38, 138 of the outdoor unit itself are at or below a prescribed aperture. In step S26, when prescribed conditions of step S22 have been satisfied and the process has proceeded to step S24, it is also determined whether the outdoor expansion valves 38, 138 of another indoor unit are at or below a prescribed aperture. In step S26, it is also determined whether other conditions have been satisfied. The other conditions are a condition that the aperture of all of the indoor expansion valves 41 be less than a prescribed aperture and a state has been achieved in which control can be sufficiently carried out, and a condition in which the discharge SH has become sufficiently high in another outdoor unit in which the conditions of step S22 have been satisfied. In a case in which any of these conditions has been satisfied in step S26, it is determined that a state in which excess refrigerant is stagnating in the indoor heat exchanger 42 has been resolved, and the process exits from accumulator refrigerant accumulation control and returns to step S21 via step S27. In step S27, the flag G related to the execution of accumulator refrigerant accumulation control is set to 0 and the aperture of the bypass valve 62 is reduced. On the other hand, in a case in which the condition of step S26 is not satisfied, the process returns to step S24 in order to continue accumulator refrigerant accumulation control.

Accumulator refrigerant accumulation control in the excess refrigerant control during cooling operation, as well as excess refrigerant control during heating operation as described above, is carried out only in a single outdoor unit even when conditions have been satisfied in a plurality of outdoor units. The order of priority is determined in advance. Also, when a plurality of other machines (other outdoor units) is present in which the conditions of step S12 and step S22 are satisfied, accumulator refrigerant accumulation control is given priority in outdoor units having a large discharge SH.

<Outdoor Rotation Control Following Accumulator Refrigerant Accumulation Control>

Figure 5:
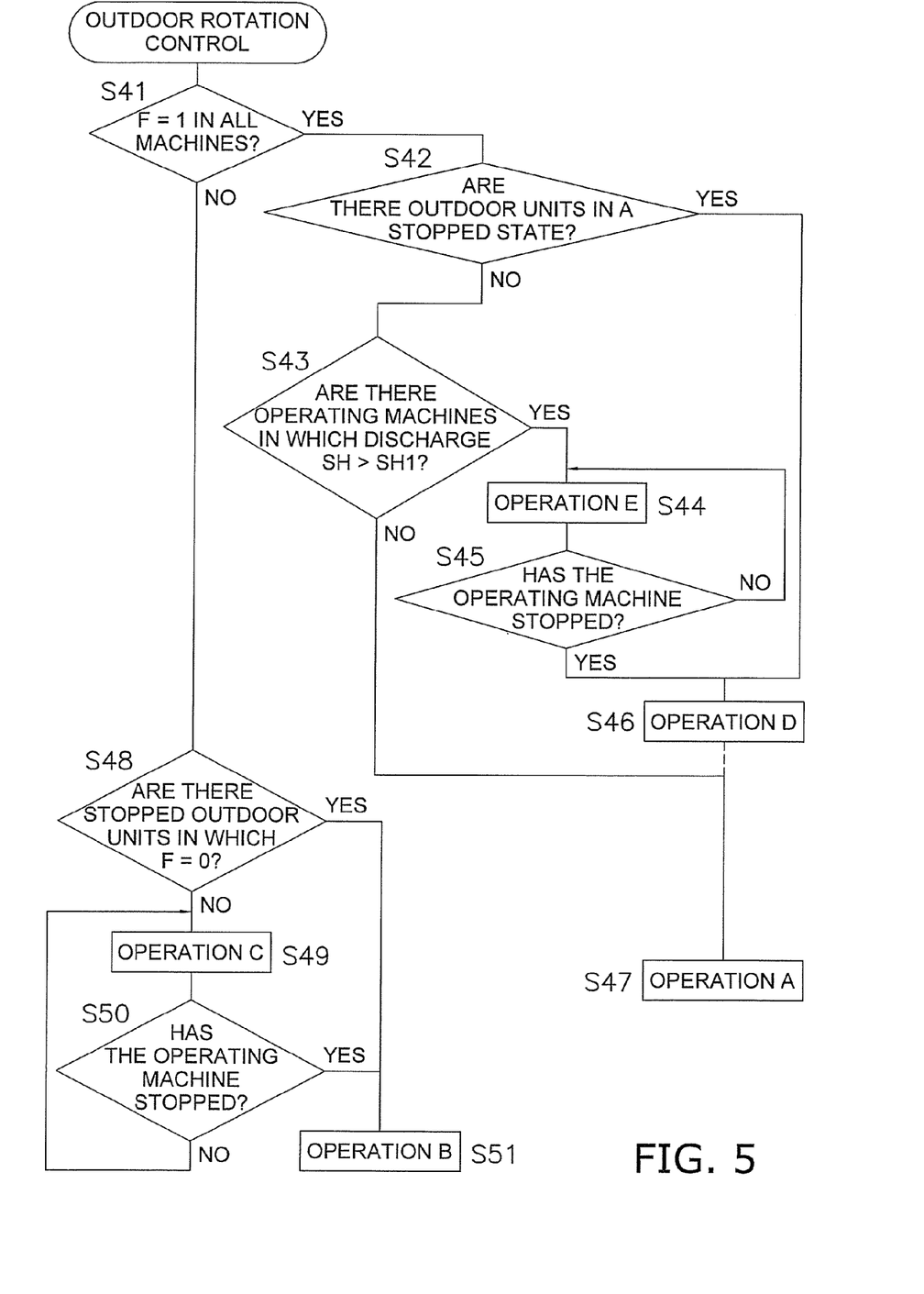
FIG. 5 is a flowchart of outdoor rotation control.

In the air conditioner 1 according to the present embodiment, when accumulator refrigerant accumulation control is carried out for accumulating excess refrigerant in the accumulators 24, 124 in the excess refrigerant control during cooling or heating as described above, the limit of excess refrigerant adjustment in the accumulators 24, 124 is reached when the discharge SH is less than the prescribed value SH1 or when the aperture of the bypass valve 62 is completely open, whereupon it is determined that excess refrigerant is present in the outdoor unit, and the process proceeds to the outdoor rotation control shown in FIG. 5. This outdoor rotation control includes rotation for shifting the operation of the accumulator refrigerant accumulation control described above to another outdoor unit, as well as rotation for starting a stopped outdoor unit and stopping the outdoor unit in which excess refrigerant adjustment has reached a limit. The outdoor rotation control of step S18 and step S28 described above will be described below with reference to FIG. 5. Each step is carried out by the controller 50.

First, in step S41, it is determined whether the flag F is set for indicating a history that accumulator refrigerant accumulation control has been performed in all outdoor units (referred to as "all machines" in FIG. 5), i.e., whether the flag F is equal to 1 in all outdoor units. The process proceeds to step S42 when the flag F is equal to 1 in all of the outdoor units. The process proceeds to step S48 when the flag F is equal to 0 in even a single outdoor unit.

In step S42, it is determined whether an outdoor unit is in a stopped state. If there is an outdoor unit that is in a stopped state, the process proceeds to step S46, and if there is no outdoor unit in a stopped state, the process proceeds to step S43.

In step S43, it is determined whether there is an outdoor unit in which the discharge SH is greater than the prescribed value SH1 (referred to as "operating machine" in FIG. 5). If there is such an outdoor unit, the process proceeds to step S44, and if there is no such an outdoor unit, the process proceeds to step S47.

In step S44, a prescribed operation E is carried out. In the operation E, first, the apertures of the bypass valves 62, 162 are set to a prescribed low aperture (or completely closed) for outdoor units in which the discharge SH is less than a prescribed value SH1, or in which the bypass valves 62, 162 are completely open. Accumulator refrigerant accumulation control is carried out in an outdoor unit in which the discharge SH is greater than a prescribed value SH1. Thereafter, when a prescribed time period has elapsed or another condition is satisfied, the outdoor unit in which the apertures of the bypass valves 62, 162 are set to a prescribed low aperture (or completely closed) is returned to normal control, and the apertures of the bypass valves 62, 162 are also returned to normal control. When a plurality of outdoor units is present in which the discharge SH is greater than a prescribed value SH1, outdoor units in which the discharge SH is high are given priority and accumulator refrigerant accumulation control is carried out.

In step S45, it is determined whether the outdoor unit in which the discharge SH is greater than a prescribed value SH1 has stopped. When the outdoor unit has not stopped, the process returns to step S44. When the outdoor unit has stopped, the process proceeds to step S46.

In step S46, a prescribed operation D is performed. In operation D, rotation is performed in which a stopped outdoor unit is started up, and another outdoor unit is stopped in place thereof (an outdoor unit in which the discharge SH is less than a prescribed value SH1). The process proceeds from step S46 to step S47 when the operation D has been repeated three times in a prescribed interval of time (e.g., one hour).

In step S47, a prescribed operation A is carried out. In operation A, the apertures of the bypass valves 62, 162 are set to a prescribed low aperture (or completely closed) for outdoor units in which the discharge SH is less than a prescribed value SH1. After a prescribed time period has elapsed or another condition has been satisfied, the outdoor unit in which the apertures of the bypass valves 62, 162 are set to a prescribed low aperture (or completely closed) is returned to normal control, and the apertures of the bypass valves 62, 162 are also returned to normal control.

In step S48, it is determined whether an outdoor unit is in a stopped state in which the flag F is equal to 0. If there is such an outdoor unit, the process proceeds to step S51, and if there is no such an outdoor unit, the process proceeds to step S49.

In step S49, a prescribed operation C is carried out. In the operation C, first, the apertures of the bypass valves 62, 162 are set to a prescribed low aperture (or completely closed) for outdoor units in which the discharge SH is less than a prescribed value SH1, or in which the bypass valves 62, 162 are completely open. Accumulator refrigerant accumulation control is carried out in an outdoor unit in which the flag F is equal to 0. Thereafter, when a prescribed time period has elapsed or another condition is satisfied, the outdoor unit in which the apertures of the bypass valves 62, 162 are set to a prescribed low aperture (or completely closed) is returned to normal control, and the apertures of the bypass valves 62, 162 are also returned to normal control. When a plurality of outdoor units is present in which the flag F is equal to 0, outdoor units in which the discharge SH is high are given priority and accumulator refrigerant accumulation control is carried out.

In step S50, it is determined whether there is a stopped outdoor unit. If there is a stopped outdoor unit, the process proceeds to step S51, and if there is no stopped outdoor unit, the process returns to step S49.

In step S51, a prescribed operation B is carried out. In operation B, rotation is performed in which a stopped outdoor unit in which the flag F is equal to 0 is started up, and another outdoor unit is stopped in place thereof (an outdoor unit in which the discharge SH is less than a prescribed value SH1). In the case that there is a plurality of stopped outdoor units in which the flag F is equal to 0, the outdoor units are started up in sequence. Stopped outdoor units in which the flag F=1 are not started up.

As described above, in the air conditioner 1 according to the present embodiment, when there is an outdoor unit in which the flag F is not set (flag F is equal to 0), which indicates a history that accumulator refrigerant accumulation control has been performed, the controller 50 preferentially starts up the outdoor unit (step S41 and step S51). Also, if there is a outdoor unit in which the flag F is not set (flag F equal to 0), indicating a history that accumulator refrigerant accumulation control has been performed, priority is given to such an outdoor unit, and accumulator refrigerant accumulation control is carried out (step S41 and step S49). When an outdoor unit in a stopped state exists, accumulator refrigerant accumulation control is not carried out in the outdoor units in an operating state, but rather priority is given to starting up the outdoor units in a stopped state (step S42 and step S46).

The operations described above are also applicable to the operation of air conditioner 1 in which only the two outdoor units 2, 102 shown in FIG. 1 exist as heat source units, but the operations are also directly applicable to cases in which three or more outdoor units are connected in parallel, and can be described without assigning the above reference numerals to the outdoor units.

(Characteristics of the Air Conditioner)

(1)

The controller 50 of the air conditioner 1 first performs accumulator refrigerant accumulation control, as shown in FIGS. 3 and 4, and when it has been determined that the amount of refrigerant during accumulator refrigerant accumulation control is excessive (step S15 or step S25), a transition is made to outdoor rotation control in which stopped outdoor units are started up, accumulator refrigerant accumulation control in other operating outdoor units is performed, or other actions are performed. In this manner, accumulator refrigerant accumulation control is performed first, and the number of times that another outdoor unit is affected can be reduced because excess refrigerant is adjusted in the outdoor unit itself in which excess refrigerant has been generated.

(2)

The controller 50 carries out outdoor rotation control (step S15, step S25) in which stopped outdoor units are started up, accumulator refrigerant accumulation control in other operating outdoor units is performed, or other actions are performed when the discharge SH is less than a prescribed value SH1, the apertures of the bypass valves 62, 162 are completely open, or the adjustment of excess refrigerant by the accumulators 24, 124 has reached its limit, i.e., when it has been determined that the amount of refrigerant in the outdoor unit is excessive. In accordance with the outdoor rotation control, refrigerant can be moved to another outdoor unit from an outdoor unit in which the conditions of step S15 or step S25 have been satisfied and excess refrigerant has been generated, by starting up another heat source unit in a stopped state, or by carrying out accumulator refrigerant accumulation control in the other heat source unit. Accordingly, when the configuration of the air conditioner 1 according to the present embodiment is adopted, situations can be reduced in which excess refrigerant pools in the outdoor units 2, 102 and smooth operation is disrupted, even in cases in which the capacity of the accumulators 24, 124 is relatively small.

(3)

In the air conditioner 1, bypass refrigerant circuits 61, 161, which are circuits used as the cooling sources of the supercooler 25, are used as circuits for directing excess liquid refrigerant to the accumulators 24, 124. In other words, a circuit for cooling a refrigerant sent from the outdoor heat exchanger 23 to the indoor expansion valve 41, and a circuit for moving excess refrigerant to the accumulator 24 are dually used in a single bypass refrigerant circuit (bypass refrigerant circuit 61 in the first outdoor unit 2, and bypass refrigerant circuit 161 in the second outdoor unit 102). The outdoor units 2, 102 can thereby be designed at lower cost.

(4)

It is more effective to start up an outdoor unit in a stopped state than to perform accumulator refrigerant accumulation control in another outdoor unit in an operating state in terms of moving the refrigerant from an outdoor unit in which the refrigerant has become excessive to another outdoor unit. Therefore, the controller 50 of the air conditioner 1 gives priority to starting up another unit in a stopped state when such a unit is present (step S42 and step S46, step S48 and step S51). The continuation of operation of the outdoor unit in a state in which excess refrigerant is present can thereby be resolved at an earlier stage.

(5)

An outdoor unit in which accumulator refrigerant accumulation control has already been performed once is in a state in which a relatively large amount of liquid refrigerant is accumulated in the accumulators 24, 124 when control is ended, and the possibility that a considerable amount of refrigerant is accumulated in the accumulators 24, 124 is high even when the refrigerant has been moved thereafter. Accordingly, when it has been determined that the amount of refrigerant in the outdoor unit is excessive (step S115, step S25) and when there is an outdoor unit in which the flag F, which indicates whether there is a history that accumulator refrigerant accumulation control has been performed, is not set (flag F is equal to 0), the controller 50 of the air conditioner 1 gives priority to that outdoor unit and starts up the unit (step S41 and step S51), or gives priority to that outdoor unit and performs accumulator refrigerant accumulation control (step S41 and step S49). The continuation of operation of the outdoor unit in a state in which excess refrigerant is present can thereby be resolved at an earlier stage.

Modified Examples

A

In the present embodiment, bypass refrigerant circuits 61, 161, which are circuits used as cooling sources of the supercooler 25, are used for moving excess liquid refrigerant to the accumulators 24, 124, but a separate dedicated circuit may be provided for directing the excess liquid refrigerant to the accumulator 24, 124.

B

In the present embodiment, the fact that operation A of step S47 of outdoor rotation control is repeated leads to a strong possibility that a refrigerant has been excessively charged in the refrigerant circuit 10 of the air conditioner 1. Therefore, in such a case, an alarm may be issued to provide notification of excessive refrigerant charging. For example, when the operation A is carried out a prescribed number of times in a prescribed time period, a reminder of caution may be outputted and displayed on a remote control or the like.

INDUSTRIAL APPLICABILITY

The air conditioner according to the present invention has the effect of reducing situations in which excess refrigerant pools in the outdoor unit and smooth operation is disrupted, even in cases in which the capacity of the accumulator is relatively small, and is useful as an air conditioner in which a plurality of heat source units is present in a single refrigerant circuit.

The invention claimed is:

1. An air conditioner comprising:
a plurality of heat source units each having a compressor, a four-way switching valve, a heat source-side heat exchanger, a supercooler, an accumulator disposed on an intake side of the compressor, a bypass refrigerant circuit having a bypass flow control valve to adjust flow rate of refrigerant that flows through the bypass refrigerant circuit, and the plurality of heat source units including at least a first heat source unit and a second heat source unit;
a utilization unit having a utilization-side expansion mechanism and a utilization-side heat exchanger;
a liquid refrigerant communication pipe and a gas refrigerant communication pipe connecting the plurality of heat source units and the utilization unit and forming a single main refrigerant circuit; and
a controller configured to
make a determination that an amount of refrigerant in the first heat source unit is excessive while the first heat source unit is in an operating state,
perform an excessive refrigerant control in response to the determination that the amount of refrigerant in the first heat source unit is excessive, the excessive refrigerant control including an other-unit startup control to start up the second heat source unit in a stopped state and set the second heat source unit in an operating state such that air is conditioned by the second heat source unit,
perform a refrigerant accumulation control by the bypass refrigerant circuit directing refrigerant from between the heat source-side heat exchanger and the liquid refrigerant communication pipe to between the four-way switching valve and the accumulator without passing through the accumulator, and
first perform the refrigerant accumulation control in the first heat source unit in response to prescribed refrigerant accumulation conditions having been firmed in the first heat source unit, and then perform the other-unit startup control in the second heat source unit in response to the determination that the amount of refrigerant in the first heat source unit is excessive during refrigerant accumulation control thereof.

2. The air conditioner as recited in claim 1, wherein the supercoolers cool a refrigerant sent from the heat source-side heat exchangers to the utilization unit via the liquid refrigerant communication pipe, using the refrigerant that flows from the bypass flow control valve to the accumulator.

3. The air conditioner as recited in claim 2, wherein the controller makes the determination that the amount of refrigerant is excessive in the first heat source unit in response a degree of superheat of gas refrigerant on a discharge side of the compressor having fallen below a prescribed value.

4. The air conditioner as recited in claim 3, wherein the controller sets a refrigerant accumulation-processed flag in the first heat source unit for which refrigerant accumulation control has been performed, and in response to the determination that the amount of refrigerant in the first heat source unit is excessive, performs the other-unit startup control in the second heat source unit in which the refrigerant accumulation-processed flag has not been set.

5. The air conditioner as recited in claim 2, wherein the controller makes the determination that the amount of refrigerant is excessive in the first heat source unit in response to the bypass flow control valve being completely open or in response to a degree of superheat of gas refrigerant on a discharge side of the compressor having fallen below a prescribed value.

6. The air conditioner as recited in claim 1, wherein the prescribed refrigerant accumulation conditions during cooling operation include at least one of a first condition in which a degree of refrigerant supercooling at an outlet of the heat source-side heat exchanger is higher than a prescribed value, and
a second condition in which a pressure of high-pressure refrigerant on a discharge side of the compressor is higher than a prescribed value.

7. The air conditioner as recited in claim 1, wherein
each heat source unit further has a heat source-side expansion mechanism that includes an expansion valve disposed between the heat source-side heat exchanger and the liquid refrigerant communication pipe, and
the prescribed refrigerant accumulation conditions during heating operation include at least a third condition in which the expansion valve of the heat source-side expansion mechanism is completely open.

8. The air conditioner as recited in claim 1, wherein
the controller makes the determination that the amount of refrigerant is excessive in the first heat source unit in response to a degree of superheat of gas refrigerant on a discharge side of the compressor having fallen below a prescribed value.

9. The air conditioner as recited in claim 1, wherein
the controller sets a refrigerant accumulation-processed flag in the first heat source unit for which refrigerant accumulation control has been performed, and in response to the determination that the amount of refrigerant in the first heat source unit is excessive, performs the other-unit startup control in the second heat source unit in which the refrigerant accumulation-processed flag has not been set.

10. The air conditioner as recited in claim 1, wherein
the excessive refrigerant control further includes stopping the first heat source unit.

11. The air conditioner as recited in claim 10, wherein
the first heat source unit is returned to normal control when a prescribed amount of time has elapsed or another condition is satisfied after the excessive refrigerant control is performed.

12. A first heat source unit of an air conditioner in which a second heat source unit and a utilization unit are connected to form a single main refrigerant circuit, and in which heat exchange is performed between air in a target air-conditioning space and a utilization-side heat exchanger of the utilization unit, the first heat source unit comprising:

a compressor;
a four-way switching valve;
a heat source-side heat exchanger;
a supercooler;
an accumulator disposed on an intake side of the compressor;
a bypass refrigerant circuit having a bypass flow control valve to adjust flow rate of refrigerant that flows through the bypass refrigerant circuit; and
a controller being configured to
  make a determination that an amount of refrigerant in the first heat source unit is excessive while the first heat source unit is in an operating state,
  perform an excessive refrigerant control in response to the determination that the amount of refrigerant in the first heat source unit is excessive, the excessive refrigerant control including an other-unit startup control to start up the second heat source unit in a stopped state and set the second heat source unit in an operating state such that air is conditioned by the second heat source unit,
  perform a refrigerant accumulation control by the bypass refrigerant circuit directing refrigerant from between the heat source-side heat exchanger and a liquid refrigerant communication pipe to between the four-way switching valve and the accumulator without passing through the accumulator, and
  first perform the refrigerant accumulation control in the first heat source unit in response to prescribed refrigerant accumulation conditions having been formed in the first heat source unit, and then perform the other-unit startup control in the second heat source unit in response to the determination that the amount of refrigerant in the first heat source unit is excessive during refrigerant accumulation control thereof.

13. The first heat source unit as recited in claim 12, wherein
the excessive refrigerant control further includes stopping the first heat source unit.

14. The first heat source unit as recited in claim 13, wherein
the first heat source unit is returned to normal control when a prescribed amount of time has elapsed or another condition is satisfied after the excessive refrigerant control is performed.

* * * * *